July 28, 1959

R. R. BURKHALTER ET AL 2,897,023

MIDSHIP BEARING SUPPORT

Filed April 5, 1954

INVENTORS
Robert R. Burkhalter
Philip J. Mazziotti
BY Lawrence C. Withers
ATTORNEY United States Patent Office 2,897,023
Patented July 28, 1959

2,897,023

MIDSHIP BEARING SUPPORT

Robert R. Burkhalter and Philip J. Mazziotti, Toledo, Ohio, assignors to Dana Corporation, Toledo, Ohio, a corporation of Virginia Application April 5, 1954, Serial No. 420,867

4 Claims. (Cl. 308—184)

This invention relates to shaft mountings, and particularly to a type which may be utilized advantageously in the support from a frame, such as a vehicle frame, of one of the sections of a propeller or driving shaft.

In the usual motor vehicle, the propeller shaft extends at an inclination from the transmission to the differential and at its opposite ends is connected by universal jonits or couplings to the transmission shaft and to the driving shaft or element of the differential. In large trucks or busses, for example, the propeller shaft cannot be arranged in this manner because with the greater length of the shaft, the shaft would flex and whip to an objectionable extent. To prevent this whipping or flexing, an intermediate shaft section may be provided, which is mounted in bearings carried by the vehicle and connected by a universal joint to an inclined propeller shaft leading to the differential.

The primary object of the present invention resides in the provision of a flexible mounting for such intermediate shafts which includes a soft rubber bracket provided with an opening for receiving an antifriction or other bearing in turn rotatably supporting the shaft, the bearing being provided with a lubricant seal and a dust shield which provides a tortuous path which is particularly effective in preventing the ingress of dirt and moisture to the bearing assembly.

Figure 1:
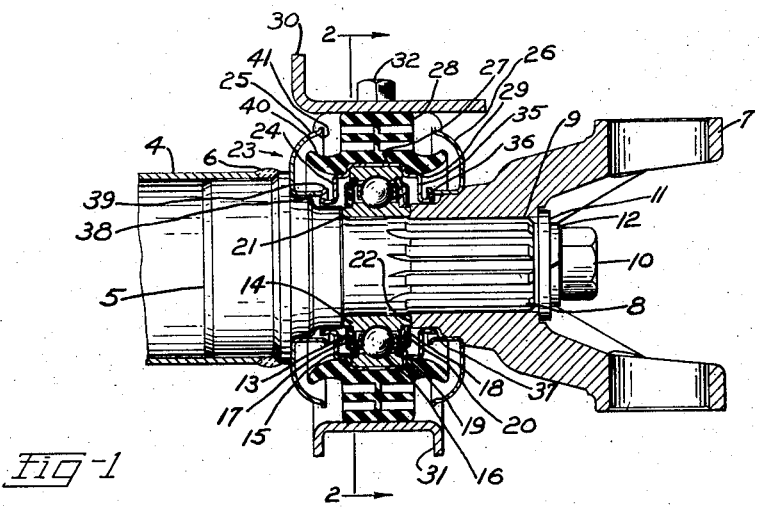
Figure 2:
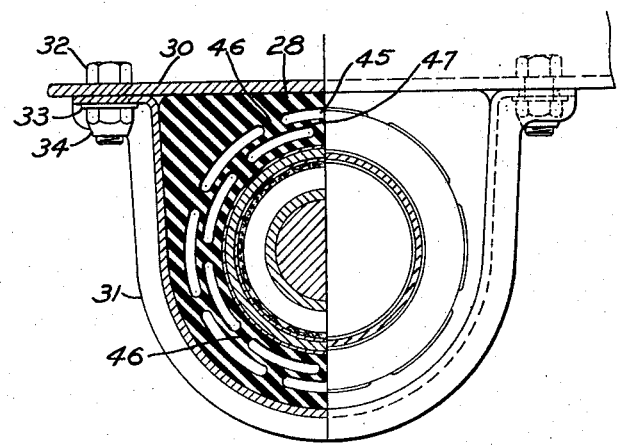

The foregoing and further objects and advantages of the present invention will be apparent from the following description when taken in connection with the accompanying drawing in which:

Figure 1 is a sectional view of a shaft mounting for vehicle propeller shafts and constructed in accordance with this invention; and Figure 2 is a front view of the same, viewed partly from a transverse section through the shaft in advance of the mounting and partly on a line 2—2 of Figure 1.

In the illustrated embodiment of the invention and referring particularly to Figure 1, a propeller shaft tube 4 extends from a suitable universal coupling (not shown) usually at the vehicle transmission. The propeller shaft 4 supports stub shaft 5 of a universal joint or coupling, one yoke of which is shown at 7.

Propeller shaft tube 4 is joined by weld 6 to stub shaft 5 which can be one source of shaft eccentricity which is compensated for by this invention.

The stub shaft 5 is splined at 8 to receive the splined end 9 of the yoke 7, and tapped to receive bolt 10 which together with washer 11 and lock washer 12 forms suitable means for retaining yoke 7 on stub shaft 5.

Stub shaft 5 is rotatably supported by a bearing and lubricant sealing assembly 13 which comprises an inner race 14, an outer race 15, suitable antifriction elements such as ball bearings 16, bearing cages 17, and sealing elements consisting of a pair of cupped metallic washers 18 and 19 which embrace a washer 20 made of felt or other suitable material. The inner race 14 is pressed on stub shaft 5 against shoulder 21 and retained by face 22 of yoke 7. Other types of bearings may be used, if desired.

A novel dust shield assembly 23, consisting of sleeve member 24 and generally cup-shaped deflectors 25 and 26, surrounds bearing assembly 13 to protect the bearing from dust and dirt. The deflectors 25 and 26 are mounted on shaft 5 and yoke 7, respectively for rotation therewith.

Sleeve 24 and bearing assembly 13 are received and retained in a suitable aperture 27 in a flexible rubber block 28 of the character shown. Annular lip portions 29 are provided at the ends of the aperture 27 to provide in effect a pocket to embrace the sleeve and bearing assembly which pocket is the only means for retaining this assembly in the rubber block 28. The flexible rubber block 28 is secured to the frame member 30 by means for a generally U-shaped bracket 31 provided with apertured ear portions adapted to receive bolts 32, lockwashers 33 and nuts 34.

The sleeve 24 is formed with radially inwardly extending side walls 35 which terminate in axially extending lip portions 36 having outwardly flaring edges 37. Each deflector 25 and 26 is provided with a central flange 38 having a press fit on its support and adapted to extend inwardly in overlapping relation with respect to edges 37 of sleeve 24. The flanges 38 are formed with outwardly flaring edges 39 terminating axially inwardly of edges 37.

Adjacent the annular lip portions 29 of block 28, the block is formed with annular outwardly cupped projections 40 which provide annular pockets within the inturned outer peripheries 41 of the deflectors 25 and 26. Thus, a dust shield has been provided which will effectively prevent the ingress of dirt and moisture.

The rubber block 28 is also provided with annular series of slots 45 having staggered connecting webs 46 cored into the block from each side and providing a thin central wall 47. Thus, a very soft, flexible rubber block is made even more flexible by this arrangement. In addition, it will be noted that this arrangement provides for uniform flexure of the rubber block in all radial directions. By means of such a supporting structure, the propeller shaft is permitted to find its own center of gravity while eccentricities, regardless of cause are compensated for.

While the mounting has been described and illustrated in connection with its use as a mounting for automotive propeller shafts, it is to be understood that it may be applied to the support of other universally jointed shafts where similar operating conditions or problems are encountered.

It will be obvious that various changes in the details, which has been herein described and illustrated in order to explain the nature of the invention, may be made by those skilled in the art within the principle and scope of the invention as expressed in the appended claims.

What is claimed is:

1. A shaft center bearing including a rubber bracket having an opening therethrough, a rotatable shaft extending through said opening, a shaft bearing retained in said bracket opening only by the shape of the rubber bracket adjacent the opening, said rubber bracket being provided with two staggered series of slots opening inwardly from each side thereof separated by a thin central wall to render said bracket soft and flexible to offer low resistance to spinning forces due to shaft eccentricity so that said shaft passes through its critical speed well below the normal operating range of said shaft, and a peripheral reinforcement for said rubber bracket.

2. In combination with a propeller shaft, a universal joint member fitted to the end of the shaft, an anti-friction bearing assembly having its inner race clamped between said joint member and a shaft shoulder, a rubber ring embracing the outer race and forming a resilient mounting for the bearing assembly, a frame bracket receiving and supporting said rubber ring, said rubber ring being provided with axial slots extending inwardly from opposite sides thereof and terminating in a thin central wall to render said ring soft and flexible, and said rubber ring being formed with axial, annular projections providing oppositely extending dirt deflectors.

3. A device for rotatably supporting a shaft from a fixed member, said device including a block of soft and flexible rubber fixed adjacent the one edge to the fixed member, the rubber block having an aperture in which is held a bearing for the shaft, the block being formed with a plurality of axially directed arcuate slots, concentric with the bearing axis, extending from each end of the rubber block and terminating short of the central plane to leave a central transverse web.

4. A shaft center bearing including a rubber bracket having an opening therethrough, a rotatable shaft extending through said opening, a shaft bearing retained in said bracket adjacent the opening, said rubber bracket being provided with two series of slots opening inwardly from each side thereof, the slots in each side being separated by staggered connecting webs, to render said bracket soft and flexible to offer low resistance to spinning forces due to shaft eccentricity.

References Cited in the file of this patent

UNITED STATES PATENTS

| | | |
|---|---|---|
| 1,888,475 | Schmitz | Nov. 22, 1932 |
| 1,895,288 | Larsh | Jan. 24, 1933 |
| 2,465,785 | Berno | Mar. 29, 1949 |
| 2,485,537 | Roe | Oct. 18, 1949 |
| 2,614,896 | Pierce | Oct. 21, 1952 |